R. SWOBODA.
SAUSAGE LINKING MACHINE.
APPLICATION FILED APR. 9, 1914.

1,153,584.

Patented Sept. 14, 1915.
8 SHEETS—SHEET 1.

Fig.1.

Witnesses
S. W. Brainard
Anna Watters

Inventor
Richard Swoboda
By John A. Bommhardt
Attorney

R. SWOBODA.
SAUSAGE LINKING MACHINE.
APPLICATION FILED APR. 9, 1914.

1,153,584.

Patented Sept. 14, 1915.
8 SHEETS—SHEET 8.

Witnesses

Inventor
Richard Swoboda
by John A. Bommhardt
Attorney

UNITED STATES PATENT OFFICE.

RICHARD SWOBODA, OF AKRON, OHIO.

SAUSAGE-LINKING MACHINE.

1,153,584.　　　　　Specification of Letters Patent.　　Patented Sept. 14, 1915.

Application filed April 9, 1914.　Serial No. 830,750.

*To all whom it may concern:*

Be it known that I, RICHARD SWOBODA, citizen of the United States, residing at Akron, in the county of Summit and State of Ohio, have invented certain new and useful Improvements in Sausage-Linking Machines, of which the following is a specification.

This invention relates to sausage linking machines, and has for its object to provide an improved machine for twisting and linking sausages, this operation to be effected by means of a rotary twisting drum through which the cased sausage is fed.

A further object of the invention is to provide an improved machine in which twisted links of various lengths may be produced.

A further object of the invention is to provide improved means for taking up the links as fast as they are formed, and stringing or collecting the same upon a reel containing "smoke sticks" which when full may be removed and taken to the smoke house.

A further object of the invention is to provide a machine which will twist and link double strings of sausages, two filled cases being simultaneously fed through the machine and twisted together.

It will further be seen that the machine embodies means for distributing the twisted links of sausage uniformly along the smoke sticks, said sticks being successively fed to position to receive the links as fast as each stick is filled.

Various other objects and advantages and new details in the machine will be apparent from the following description, and the accompanying drawings.

The machine consists of a frame 13, having mounted therein in suitable bearings 14, the crank shaft $14^a$, provided with the crank $14^b$. On the opposite end of the crank shaft $14^a$ is a double faced miter pinion $14^c$ engaging the miter gears $14^d$ and $14^e$. The miter gear $14^d$ is secured on a shaft 15 having mounted thereon a segmental cam wheel 16. The cam wheel 16 is provided with two cam surfaces on its periphery, $16^a$ and $16^b$. The cam surfaces $16^a$ and $16^b$ of the wheel 16 engage the friction wheel 17, which is secured upon a suitable shaft $17^a$. Also mounted upon the shaft 15 is a cam wheel 18 having only one cam surface designed to engage a friction wheel $18^a$ which is mounted upon a sleeve on the shaft $17^a$. Also mounted on the shaft 15, is still another friction cam wheel 19, similar to 18 and engaging a friction wheel $19^a$ mounted on the sleeve $17^b$. The sleeve $17^b$ is secured at either end by collars $17^c$.

Mounted on the outer end of the sleeve $17^b$ is a sprocket wheel 20, having a sprocket chain $20^a$ passing to a similar sprocket wheel $20^b$, mounted on the shaft $20^c$. The shaft $20^c$ rotates in bearings $20^d$ Figs. 2—3. The bearing $20^d$ also makes a bearing for the short shaft 21 having a bevel gear $21^a$ secured to the same. The bevel gear $21^a$ meshes with, and is driven by, a similar gear $21^b$ on the shaft $20^c$. Secured to the short shaft 21 is a slotted crank 22 Figs. 3, 7 and 8. This crank is provided with a sliding block $22^a$ adjustable by means of the adjusting screw $22^b$. The block $22^a$ is provided with a squared portion $22^c$ which oscillates an arm 23, by moving in the slot $23^a$. The arm 23 is pivoted at its lower end to the frame 24 by the pivot bracket $23^b$.

The upper end of the arm 23 is provided with a forked bearing $23^c$ adapted to receive the pivoted arm 25, which is mounted in slide blocks $25^a$ which travel reciprocally on a plate $25^b$, guided by grooves $25^c$. Also mounted in the slide blocks $25^a$ is a shaft $25^d$ having two cam blocks $25^e$ adapted to contact with the surfaces $25^f$ of the plate $25^b$. The inner end of the shaft $25^d$ is provided with the sausage feeding finger $25^g$. The plate $25^b$ is movable on the ways $24^a$, $24^b$, of the frame 24.

The shaft 17<sup>a</sup> has mounted thereon the sprocket wheel 26, provided with a key 26<sup>a</sup> adapted to engage in, and travel along, the key way 26<sup>b</sup>. A shifter rod 26<sup>c</sup> depending from one of the nipper frames 27 engages the sprocket 26. This frame 27 is mounted on the shafts 27<sup>a</sup>, secured to the table of the machine by the bearings 27<sup>b</sup>. The shafts 27<sup>a</sup> are provided with right and left threads whereby the frames 27 of the nipping device are adjusted as to width of space between the same.

Figure 1:
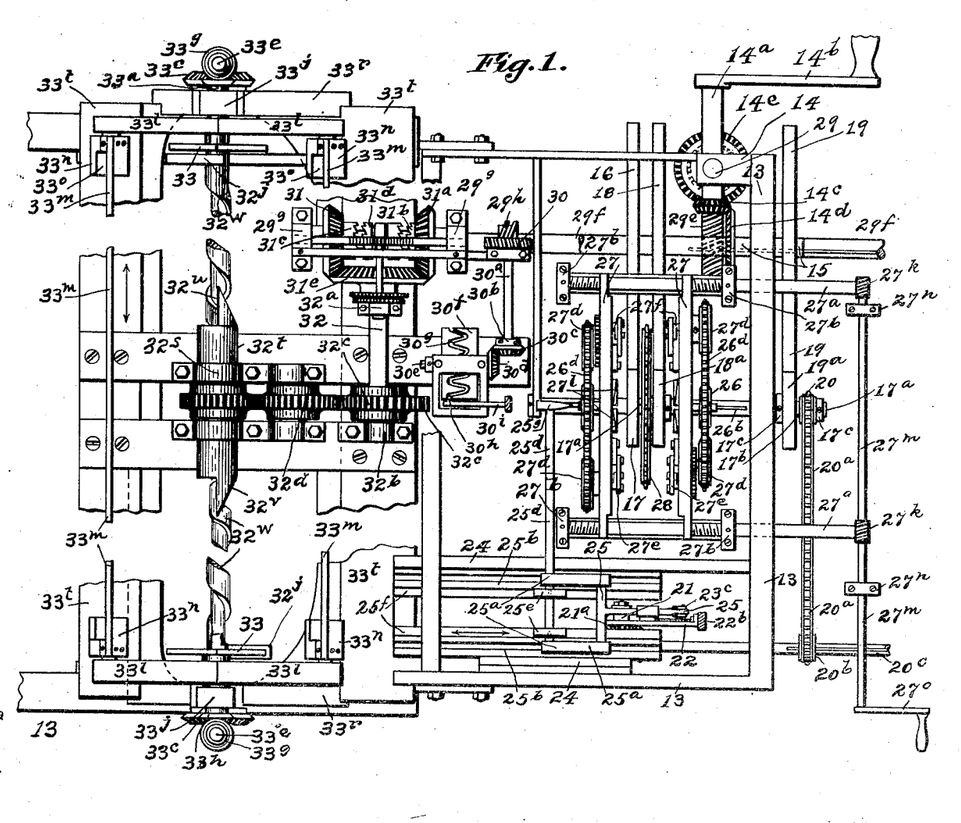
Figure 1 shows a top plan view of the sausage twisting machine having the table and twisting-head removed and a portion of the frame and parts broken away in order to condense the same.
Figures 9, 10, 11, 12:
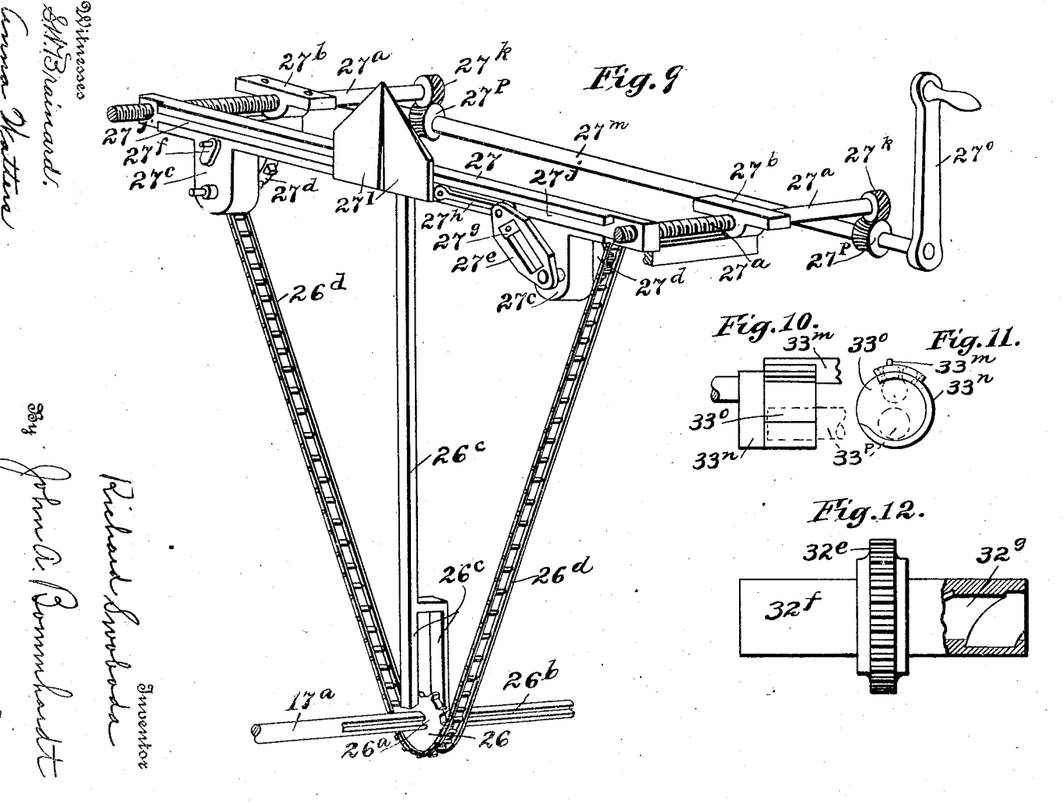
Fig. 9 is a perspective view of one unit of the sausage nipping device.
Fig. 10 is a detail of the smoke stick holder.
Fig. 11 is an end view of Fig. 10.
Fig. 12 is a detail of a gear having an internal thread—the purpose of which will be hereinafter set forth.
Figure 13:
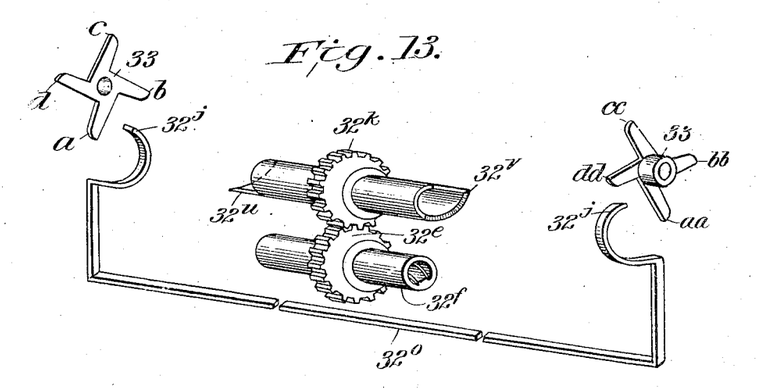
Figs. 13, 14 and 15 are details of the reel actuating mechanism.
Figure 14:
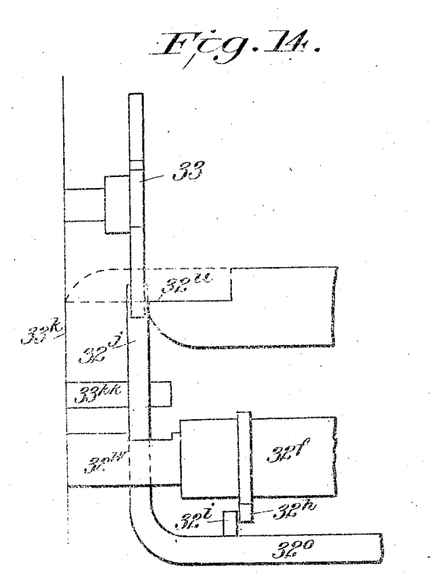
Figure 15:
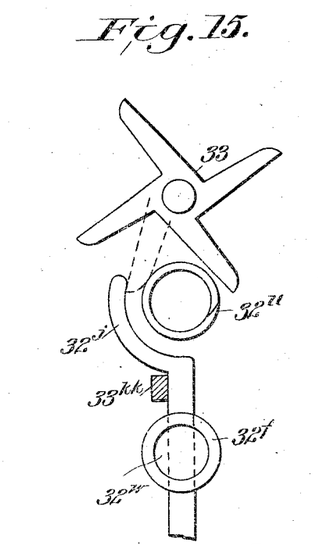

Depending from each of the frames 27 are lugs 27<sup>c</sup> which serve for bearings for the sprocket wheels 27<sup>d</sup> and oscillating links 27<sup>e</sup>. The sprocket chain 26<sup>d</sup> imparts motion from the wheel 26 to the wheels 27<sup>d</sup> which in turn operate the cranks 27<sup>f</sup>, adapted to move the blocks 27<sup>g</sup> reciprocally in the slots of the links 27<sup>e</sup>. Connected to the upper end of the links 27<sup>e</sup> are rods 27<sup>h</sup> which in turn are connected to each of the two sets of nippers 27<sup>i</sup> (Figs. 1 and 9). The nippers move reciprocally in the slots 27<sup>j</sup> of the frame 27. The shafts 27<sup>a</sup> are provided at their outer ends with spiral gears 27<sup>k</sup> adapted to mesh with similar gears 27<sup>p</sup> secured on the shaft 27<sup>m</sup>. The shaft 27<sup>m</sup> is mounted in bearings 27<sup>n</sup> secured to the underside of the table. Motion is imparted to the shaft 27<sup>m</sup> and connected parts by turning the crank 27<sup>o</sup>, secured on the shaft 27<sup>m</sup>.

Secured upon a sleeve similar to sleeve 17<sup>b</sup> on the shaft 17<sup>a</sup> is a friction wheel 18<sup>a</sup> and the sprocket wheel 28, which drives the sprocket chain 28<sup>a</sup> which in turn rotates the sausage twisting drum 28<sup>b</sup>, adapted to revolve in saddle brackets 28<sup>f</sup> secured to the table. The drum 28<sup>b</sup> is provided with removable heads 28<sup>d</sup> provided with oblong openings 28<sup>e</sup> adapted to receive the sausages before being twisted. A sprocket 28<sup>c</sup> is secured centrally of the twisting drum and engages the chain 28<sup>a</sup>.

An upright shaft 29 mounted in bearings 29<sup>a</sup>, 29<sup>b</sup> secured to the frame 13, is driven by the miter gear 14<sup>e</sup> through the bevel gear 14<sup>c</sup>. Secured to the lower end of the shaft 29 is a spiral gear 29<sup>d</sup> which meshes with a larger spiral gear 29<sup>e</sup> mounted on the shaft 29<sup>f</sup>. The shaft 29<sup>f</sup> is mounted in bearings 29<sup>g</sup>. Mounted on the shaft 29<sup>f</sup> is a worm 29<sup>h</sup> which drives a worm wheel 30, secured on the end of a shaft 30<sup>a</sup>, mounted in the bearings 30<sup>b</sup>. Secured to the other end of the shaft 30 is a bevel gear 30<sup>c</sup> adapted to mesh with a similar bevel gear 30<sup>d</sup> mounted on the shaft 30<sup>e</sup>. Also secured on the shaft 30<sup>e</sup> is a cam drum 30<sup>f</sup> having the cam slot 30<sup>g</sup> on its periphery. A suitable roller or pin 30<sup>h</sup> is secured on the end of the pivoted lever 30<sup>i</sup>, fulcrumed at 30<sup>j</sup> and extending upwardly and connected, by means of the link 30<sup>k</sup> to the sausage guide pan or chute 30<sup>l</sup> which is pivoted to the table 13<sup>a</sup>.

Figure 3:
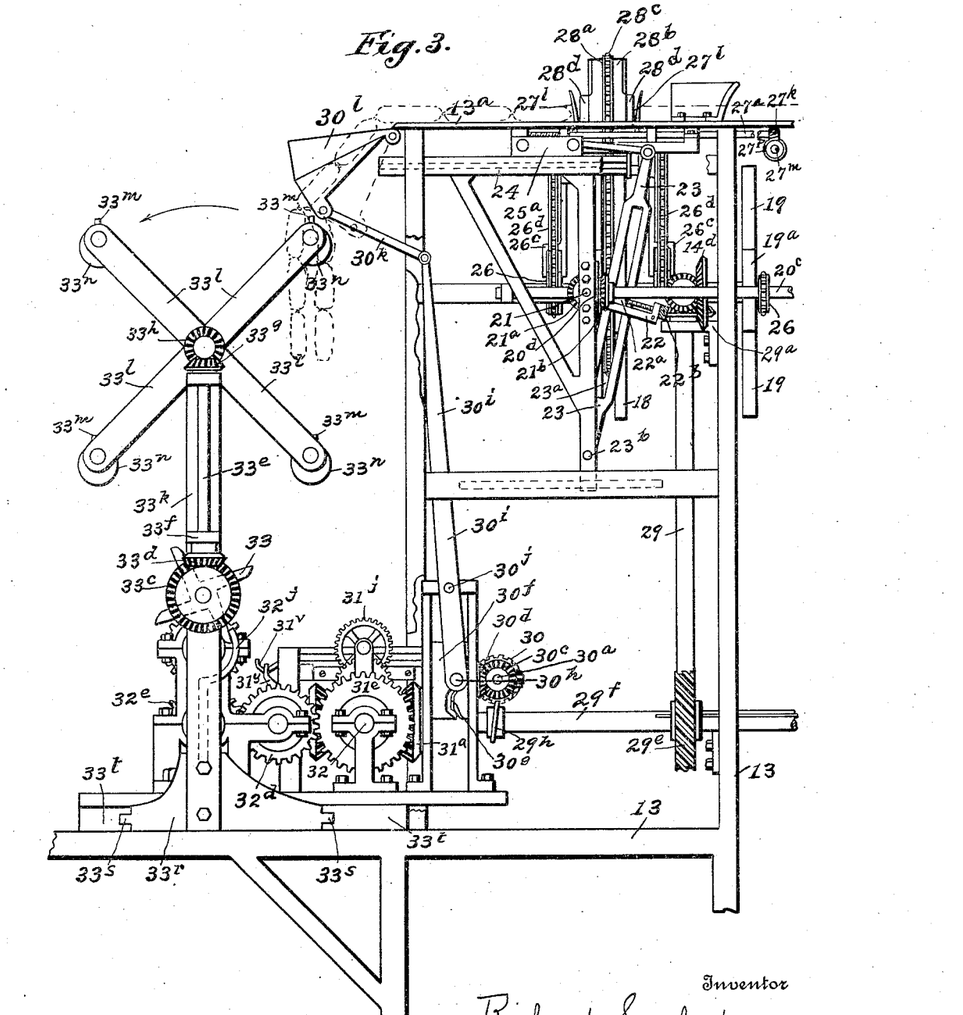
Fig. 3 is a side elevation of the right end of the machine.

Mounted loosely upon the shaft 29<sup>f</sup> (Figs. 5 and 6) are miter-gears 31 and 31<sup>a</sup> provided with portions of a clutch 31<sup>c</sup>, 31<sup>d</sup>. Also keyed to the shaft 29<sup>f</sup> and adapted to slide upon same is the clutch member 31<sup>d</sup>. A miter gear 31<sup>e</sup> is secured on the shaft 32, mounted in bearings 32<sup>a</sup>, 32<sup>b</sup>. Also secured to this shaft is a spur gear 32<sup>c</sup> adapted to mesh with the idler-gear 32<sup>d</sup> which in turn drives the pinion 32<sup>e</sup> which is secured to a hollow shaft 32<sup>f</sup> which has a long lead thread 32<sup>g</sup> (Fig. 12) cut therein. Secured on either end of the hollow shaft 32<sup>f</sup> are fingers 32<sup>h</sup> which, at the proper instant engage the lugs 32<sup>i</sup> of the detent or restrainer rod 32<sup>o</sup>, thus pushing the detents or restrainers 32<sup>j</sup> into and out of engagement with the star wheels 33 which are provided with four points (Fig. 3).

Mounted in suitable bearings 32<sup>s</sup> is a hollow shaft 32<sup>t</sup> having its ends 32<sup>u</sup> and 32<sup>v</sup> beveled oppositely. These bevels acting as cams engage and rotate the star wheels 33. These wheels have an intermittent motion making ¼ turn at each reciprocation of the reel-rack. The star wheels 33 are mounted on short shafts 33<sup>a</sup>. Secured on the shafts 33<sup>a</sup> are miter gears 33<sup>c</sup> meshing with the pinions 33<sup>d</sup> secured on the shafts 33<sup>e</sup>, rotating in bearings 33<sup>f</sup>. On the upper ends of shafts 33<sup>e</sup> are bevel pinions 33<sup>g</sup>—meshing with similar pinions 33<sup>h</sup> which are secured on the reel shafts 33<sup>i</sup> mounted in suitable bearings 33<sup>j</sup> of the upright 33<sup>k</sup>. Pawls *a* engaging ratchet *b* on the shaft 33<sup>a</sup> prevent reverse rotation. 33<sup>kk</sup> are guide arms on the frame for the detents 32<sup>j</sup>.

The sausage reel consists of two ends having four arms, 33<sup>l</sup>, each, and connected together by the guide bars 33<sup>m</sup>. Each arm 33<sup>l</sup> of the reel is provided with a smoke stick holder 33<sup>n</sup> which is pivoted eccentrically to the arms 33<sup>l</sup>. Each holder has a slot 33<sup>o</sup> to receive the smoke sticks 33<sup>p</sup>, shown in dotted lines in Figs. 11 and 12. It is assumed that the weight of the holders, smokesticks and sausage will always keep the holders in the position shown. In order that the sausages may be strung along the entire length of the smoke sticks placed in the holders on the reel, the reel is supported in a carrier comprising supports 33<sup>k</sup> mounted on a base 33<sup>r</sup> which reciprocates in guides 33<sup>s</sup> in base blocks 33<sup>t</sup> secured to the frame of the machine. This reciprocal motion is secured by the threaded rod 32<sup>w</sup> and the threaded gear wheel 32<sup>e</sup>, keyed on the hollow shaft 32<sup>f</sup>. The reversing motion of the rack is obtained through the clutch 31<sup>b</sup>, 31<sup>c</sup>, 31<sup>d</sup> and connected parts.

Figures 5, 6:
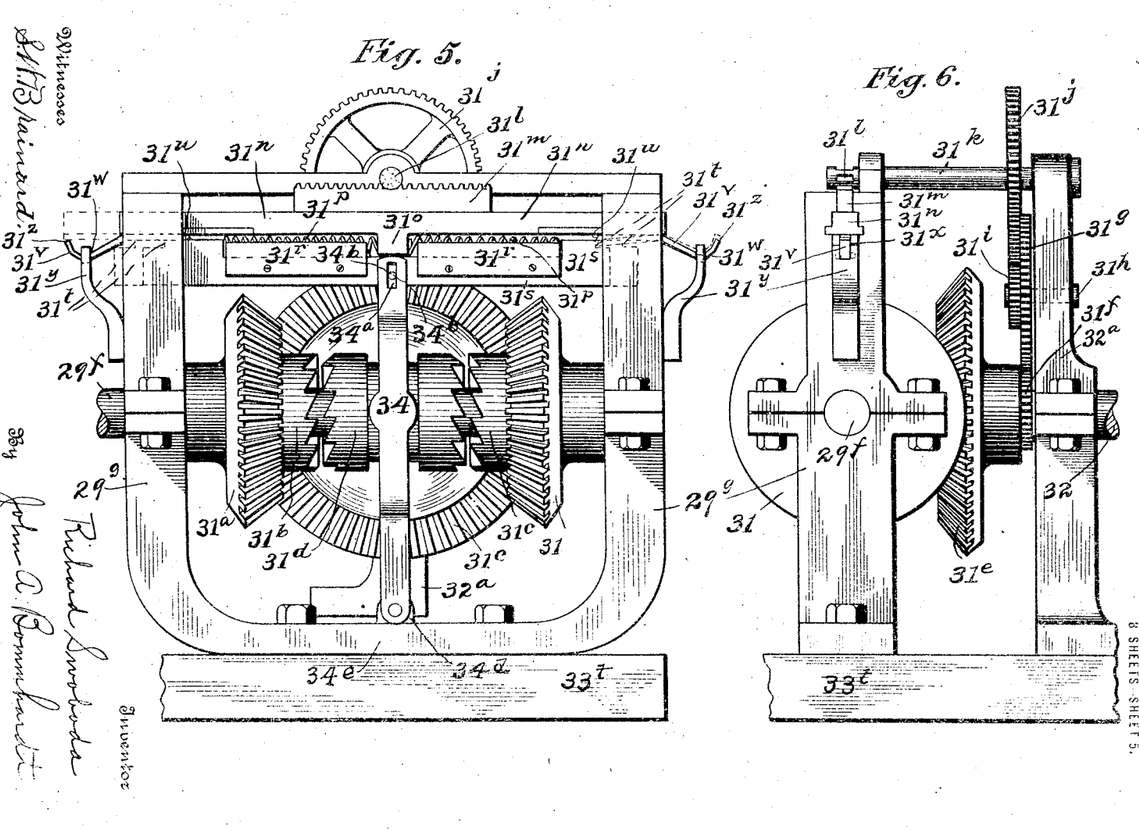
Fig. 5 is a detail view of the reversing clutch and connected parts.
Fig. 6 is an end view of Fig. 5.

Referring to Figs. 5 and 6 it will be seen that the shaft 32 has secured thereon a pinion 31<sup>f</sup> meshing with an idler 31<sup>g</sup> mounted on the stud 31<sup>h</sup>. Secured to the idler 31<sup>g</sup> is another pinion 31<sup>i</sup> which in turn meshes with the gear wheel 31ʲ—secured on the shaft 31ᵏ. The shaft, 31ᵏ, has a pinion 31ˡ cut in same and meshing with a rack 31ᵐ secured on the shifting bar 31ⁿ. The bar 31ⁿ has a centrally depending lug 31ᵒ which contacts with the springs 31ᵖ compressing each of the springs in turn. The springs 31ᵖ are held in place by plates 31ʳ screwed on the slide bar 31ˢ. This bar is provided with notched recesses 31ᵗ, adapted to receive the ends 31ᵘ of obstructors 31ᵛ. The obstructors 31ᵛ are fulcrumed at 31ʷ in the slots 31ˣ of the brackets 31ʸ secured to frame 29ᵍ. The obstructors 31ᵛ are provided with upwardly slanting projections 31ᶻ. A clutch-shifting lever 34 is provided with a slot 34ᵃ adapted to receive the pin 34ᵇ secured in the slide bar 31ˢ. The shifting lever 34 is pivoted at its lower end to a boss 34ᵈ secured to the base 34ᵉ secured on the block 33ᵗ.

Operation: It will readily be seen that if the crank 14ᵇ, and connected parts be turned in the direction indicated by the arrow on wheel 16 in Fig. 2 that the cam portion 16ᵃ will drive the friction wheel 17 a third revolution thereby opening the nippers 27ˡ by means of the crank connections thereto, allowing the ends of the two casings of sausages to be placed between them. When the cam surface 16ᵇ of the cam wheel 16 comes into engagement with the friction wheel 17, the nippers 27ˡ will close and clamp the sausages, holding same until the twisting drum 28ᵇ has made two revolutions giving the desired "twist" to the sausages, and thereby producing the links. Varying lengths of twisting drum heads 28ᵈ may be provided to take care of the various lengths of links. It will be seen that, in order to produce twisted links of sausages of various lengths, the distance between the two sets of nippers 27ˡ will have to be increased or diminished as the case may be. In order to do this the nipper frames 27 are mounted on shafts 27ᵃ having right and left threads engaging similar threads in the frame. Motion is imparted to the shafts 27ᵃ by means of the crank 27ᵒ and connected parts. Revolving the crank 27ᵒ will increase or diminish the space between the nippers as may be desired. The nippers are opened and closed by means of the friction cam-wheel 16 and friction wheel 17 secured to the shaft 17ᵃ and adapted to drive both sprocket wheels 26 by means of the keys 26ᵃ engaging the groove 26ᵇ of the shaft 27ᵃ. The sprocket wheels 26, in turn drive the chains 26ᵈ which revolve still other sprocket wheels 27ᵈ, that in turn impart motion to the respective nippers, through the pivoted links 27ᵉ and connecting rods 27ʰ. Motion is imparted to the links 27ᵉ by means of the cranks 27ᶠ on the ends of the sprocket wheel shafts.

The cranks 27ᶠ are pivoted in the blocks 27ᵍ which move in the slots of the links. The nippers are secured to slide blocks which travel in the grooves 27ʲ of the frame 27. In order to keep the sprocket 26 in line with sprockets 27ᵈ when the distance between the nippers is varied, the forked shifter rods 26ᵉ attached to the frame, depend from the same and straddle the sprocket wheels, moving the same along the shaft 17ᵃ.

Figures 7, 8:
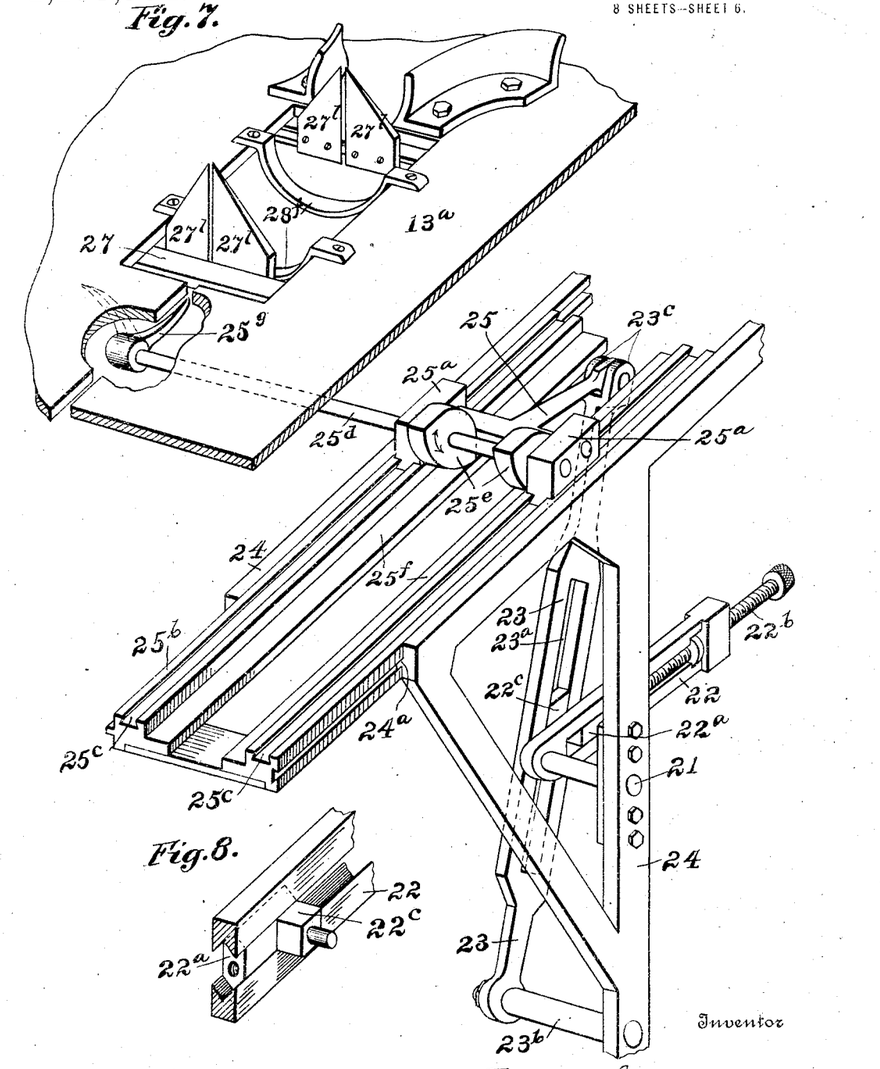
Fig. 7 is a perspective view of the sausage feeding device, part of the table, and bearing brackets for the twisting drum.
Fig. 8 is a perspective view of a portion of the adjusting block of the sausage feeding device.

Following the opening of the nippers 27ˡ described above, the sausage feeding finger 25ᵍ will turn upward to the position shown in dotted outline, Fig. 7—and pull and carry the linked sausages forward through the guide-pan 30ˡ. This operation is effected by means of the friction cam wheel 19 engaging with the timed friction wheel 19ᵃ secured on the sleeve 17ᵇ revolving loosely on shaft 17ᵃ. This sleeve is held between collars 17ᶜ. Secured on the sleeve 17ᵇ and revolving with the friction wheel 19ᵃ is a sprocket wheel 20, which imparts motion, through the chain 20ᵃ to a shaft 20ᵉ on which is loosely mounted the shaft driving sprocket 20ᵇ which has a key (not shown) engaging a groove in the shaft 20ᶜ. Motion is transmitted through the shaft 20ᶜ, bevel gears 21ᵇ, 21ᵃ, shaft 21, and slotted crank 22, to the slotted arm 23 which is given a pendulum motion, thereby causing the slide blocks 25ᵃ to move reciprocally upon the plate 25ᵇ. It will be seen by reference to Fig. 7 that as the slide blocks 25ᵃ are moved to the left the concentric portions of the cams 25ᵉ bearing upon the surfaces 25ᶠ, will revolve the shaft 25ᵈ a quarter turn, bringing the flat surfaces of the cams 25ᵉ in contact with and adapted to slide along the surfaces 25ᶠ until such time as the direction of motion of the slide blocks is changed by the return action of the arm 23. It will be seen that the turning of the shaft 25ᵈ, a quarter turn, will bring the sausage feeding finger 25ᵍ, to a vertical position, thereby hooking the same back of the "twist" between the two links of sausage and the motion of the slide blocks to the left will feed the twisted sausages forward into and through the guide-pan 301 and thence down into engagement with and onto the smoke sticks 33ᵖ. In order to increase or vary the throw of the pivoted arm 23, and the consequent travel of the slide blocks 25ᵃ and connected feed finger 25ᵍ, in order to make longer or shorter links of sausages the crank 22 is provided with an adjustable block 22ᵃ adapted to be set at any desired location in the slot, by means of the adjusting screw 22ᵇ. See Figs. 7 and 8. The portion 22ᶜ of the adjustable blocks 22ᵃ, is secured in, and moves up and down the slot 23ᵃ, of the pivoted arm 23. The plate 25ᵇ can be set at any desired position by moving same in the ways $24^a$ $24^b$ of the frame 24. This is necessary when adjusting the machine to twist varying lengths of sausages. This machine is adapted to twist links of various lengths ranging from 2½ inches to 6 inches. The machine as shown in the drawings is set to twist the smallest size mentioned. Varying lengths of sausage links may be twisted by changing the heads $28^d$ in the twisting drum $28^b$. In order to remove the drum $28^b$ from the saddle bearings $28^f$, to change the heads or clean the same, the sprocket chain $28^a$ is opened allowing the drum to be easily removed.

Figure 4:
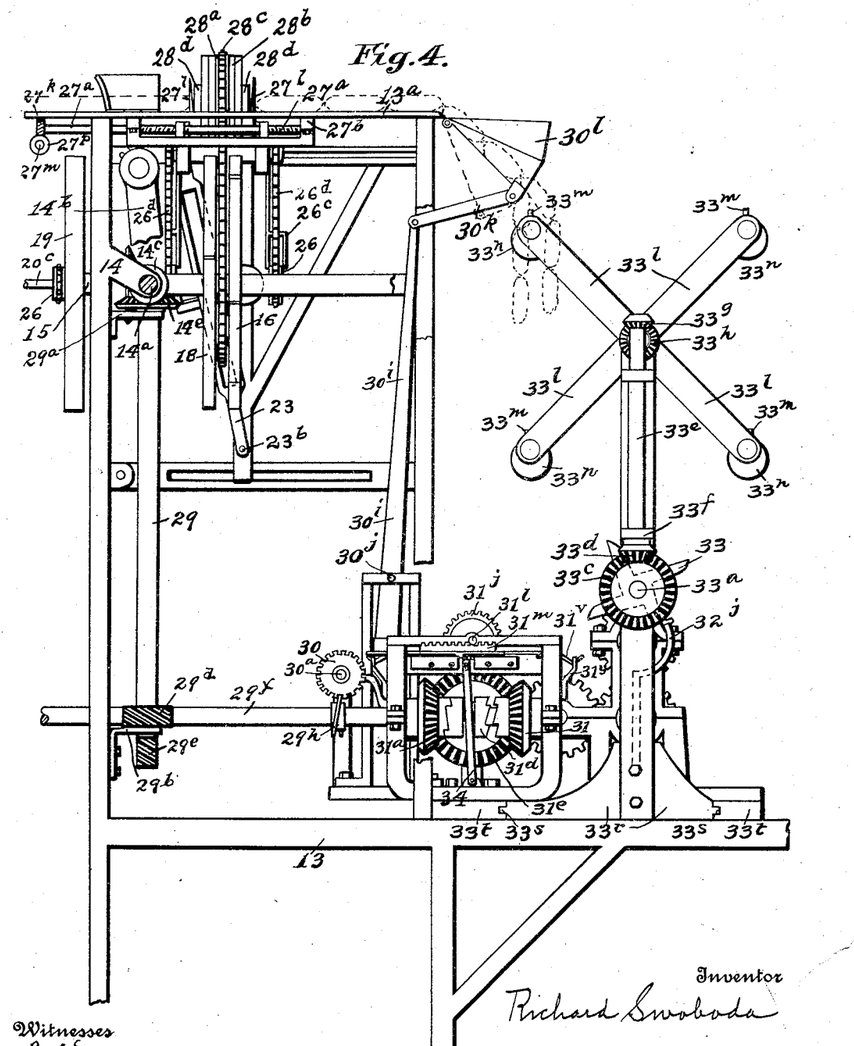
Fig. 4 is a side elevation of the left end of the machine.

The guide pan $30^l$ is operated by the crank $14^b$, miter pinion $14^c$, miter gear $14^e$, vertical shaft 29, worm $29^h$, on shaft $29^f$, worm wheel 30, shaft $30^a$, bevel gears $30^d$, $30^c$, cam drum $30^a$ secured to shaft $30^e$, pivoted arm $30^i$, and connecting rod $30^k$. The cam groove $30^g$ formed in the periphery of the drum $30^f$ has 12 pitches, in order to impart a pendulum motion to the pivoted arm $30^i$, and a resulting tilting motion to the pivoted guide-pan $30^l$. This tilting motion of the guide-pan is designed to loop the twisted links of sausages over the smoke sticks held in the arms of the rack. When in the position shown in Figs. 3 and 4 the twisted sausages will fall to the right of the smoke-sticks and when it drops to the position shown in dotted outline Figs. 3 and 4 they will drop to the left of the smoke stick.

When starting the machine it is necessary to twist six links by hand in order to have a sufficient number of twisted links to reach through the guide pan and down to the guide bar and smoke stick of the reel. This machine is designed to twist double strings of sausages two filled casing being put through simultaneously and twisted together. In order to distribute the twisted links of sausages along the full length of the smoke sticks uniformly, the reel rack $33^r$ and mounted parts are caused to reciprocate in blocks $33^t$ on ways $33^s$. This is accomplished by revolving the gear wheel $32^e$, having an internal course pitch thread $32^g$ which acts upon a similar external thread cut upon the shaft $32^w$. Reverse motion of the wheel $32^e$ and connected parts is secured by the double clutch $31^d$ adapted to engage with the clutch teeth on the hubs $31^b$, and $31^c$ of the miter gear wheels $31^a$.

Figure 2:
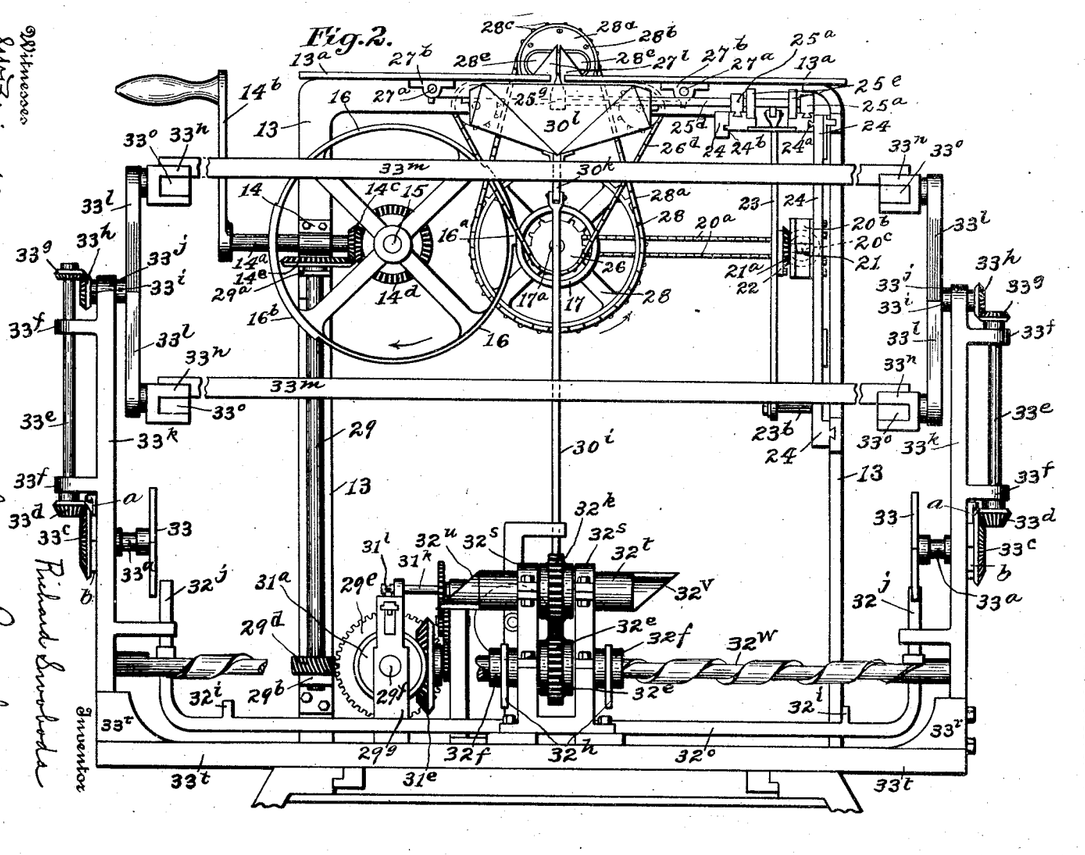
Fig. 2 is a front elevation of the same.

Referring to Figs. 5 and 6 it will be seen that the clutch is shown in a neutral position, but if the bar $31^n$ be forced to the left by means of the gear-rack $31^m$ it will move the slide bar $31^s$ through the spring $31^p$ in the same direction until the end $31^u$ of the obstructor 31 engages the notch $31^t$ of the bar $31^s$ as shown to the right of Fig. 5, the gear rack $31^n$ will continue to travel to the point shown in dotted outline, compressing the spring $31^p$. When the gear-rack $31^n$ reaches the limit of its travel as shown in dotted outline it will contact the end $31^z$ of the fulcrumed obstructor $31^v$ causing the end $31^u$ of the same to be raised out of the notch $31^t$ thereby allowing the compressed spring $31^p$ to act, throwing the slide bar $31^s$, shifter bar 34 and clutch $31^d$ to the right and engaging the clutch with the teeth on the hub $31^c$, of the miter wheel $31^a$, thereby reversing the direction of the reel rack and connected parts. Motion is given the pinion rack $31^n$ through the rack $31^m$ pinion $31^l$, shaft $31^k$, and chain of gears and idlers, $31^j$, $31^i$, $31^g$, and $31^f$. The reel consisting of the arms $33^j$, is turned intermittently by means of the beveled ends $32^u$, $32^v$, engaging the four-point star-wheels 33, the beveled portions acting as cams which actuate the star wheels ⅛ of a revolution, through shaft $33^a$, miter gears $33^c$, $33^d$, shaft $33^e$, bevel gears $33^g$, $33^h$, and shaft $33^i$. In order to hold the reel against return motion the detents or restrainers $32^j$ are adapted to engage with and lock the same. When the lugs $32^i$ on the restrainer bar $32^o$ reach a certain point, the fingers $32^h$ secured on, and revolving with the hollow shaft $32^f$, engage the said lugs and shift the restrainers out of, and into engagement with the star-wheels 33. The restrainers $32^j$ are merely upturned ends of the restrainer bar. In Fig. 2 the restrainer to the right is shown in engagement with the star-wheel and the one to the left out of engagement with the left star-wheel. The star wheels 33 are mounted to turn in opposite directions, as will appear from the gears $33^g$ and $33^h$ in Fig. 2, and a comparison of Figs. 3 and 4, and they are so mounted that their arms are at a relative angle of 45°. When the stop $32^j$ at the right is shifted out of engagement with its star wheel, the other stop $32^j$ at the left will be shifted into the path of its star wheel, but will allow it to make a one-eighth turn before it is stopped, and this one-eighth turn of the star wheel permits the reel to be given its desired quarter turn. Referring to Fig. 2, the right star wheel is in engagement and the rack is to be shifted to the right and the wheel at the left approaches the cam $32^u$, which brings the lug $32^i$ at the left toward the finger $32^h$, and at the proper instant before the cam $32^u$ actually engages the star wheel, the lug $32^i$ strikes the finger $32^h$ and thus shifts the restrainer $32^j$ into the path of the star wheel 33 at the left, and shifts the restrainer $32^j$ at the right out of engagement with its wheel, at which moment the cam $32^u$ engages with the star wheel at the left, giving it a one-eighth turn, or until the star wheel strikes the restrainer then in its path. As fast as each stick is filled by the traverse of the reel in one direction it is removed and another substituted, the reel meanwhile being turned to bring another stick in upper position under the guide pan 301 and the reel is then traversed in the opposite direction to fill the next stick, and so on.

What I claim as new is:

1. In a machine of the kind described, the combination of a sausage twisting mechanism, a stick-holder, means to shift the stick-holder laterally with respect to the plane of the movement of the sausages through the twisting mechanism, and means to deliver the sausages from the twisting mechanism to the stick, as the latter is shifted.

2. In a machine of the kind described, the combination of sausage twisting mechanism, a stick-holder, means to reciprocate said holder laterally with respect to the plane of movement of the sausages through the twisting mechanism, and means to deliver the sausages from said twisting mechanism to the stick during the movement of the latter.

3. In a machine of the kind described, the combination of sausage twisting mechanism, a stick holder, means to shift the stick holder laterally, with respect to the plane of the movement of the sausages through the twisting mechanism, and delivery means between said mechanism and the holder to loop the sausages upon and along the stick as the latter is shifted.

4. In a machine of the kind described, the combination of sausage twisting mechanism, a stick reel, means to shift the reel back and forth, means to turn the reel after each reciprocation to bring another stick into receiving position, and means to deliver sausages from the twisting mechanism to the sticks respectively, as the reel is shifted.

5. In a machine of the kind described, the combination of a sausage twisting mechanism, a multiple stick reel, a laterally reciprocating carrier for the reel, means to reciprocate the carrier, means to turn the reel at the end of each reciprocation, to bring another stick into receiving position, and means to deliver sausages from the twisting mechanism to said stick.

6. In a machine of the kind described, the combination of a sausage forming mechanism, a reel provided with a plurality of stick holders, means to reciprocate the reel laterally, lengthwise of the sticks, means to turn the reel after each lateral movement thereof, to bring another stick into receiving position, and means to deliver sausages from said forming mechanism to the stick, during such lateral movement.

7. In a machine of the kind described, the combination of a sausage forming mechanism, a stick holder, means to shift said holder lengthwise of the stick and laterally with respect to the plane of movement of the sausages through the forming mechanism and delivery devices including a vibrating guide chute located between the said forming mechanism and the stick, and operating in the same plane as the line of movement of the sausages to loop the formed sausages across and upon opposite sides of the stick as the latter is shifted.

8. In a machine or the kind described, the combination of a sausage twisting device, a stick holder, means to move said holder and stick laterally across the machine, with respect to the plane of movement of the sausages through said device, a reciprocating pulling device behind said twisting device, adapted to engage the twisted sausages and draw the same from said device, and a guide for the sausages, between said pulling device and the stick.

9. In a sausage twisting machine, the combination of two sets of nippers adapted to engage a plurality of sausage casings, means to open and close said nippers, and means located between said sets to twist the casings together while they are held by the nippers, said means including a rotary drum, provided with fixed heads at opposite ends, each head having a laterally elongated opening through which the casings pass between the sets of nippers.

10. In a sausage twisting machine, the combination of two spaced sets of nippers adapted to engage a plurality of sausage casings, the sets being adjustable with respect to each other to vary the distance therebetween, means to open and close said nippers, and means between said sets of nippers to twist casings together while they are held by the nippers, and a pulling device located behind the nippers and having a finger arranged to engage between the twisted casings and draw the same along when the nippers are opened.

11. In a sausage twisting machine, the combination with a sausage twisting mechanism, of a delivery mechanism for drawing sausages therefrom, comprising a reciprocating slide, a shaft carried thereby and provided with a finger adapted to engage the sausages, and means to turn the shaft and lift the finger to engaging position during the advance of the slide and to drop the finger during the return movement of the slide.

12. In a sausage twisting machine, the combination with a sausage twisting mechanism adjustable to vary the length of the sausages, of delivery mechanism including a reciprocating slide, means carried thereby to engage the sausages at the advance of the slide and to disengage the same on the return thereof, and means to operate the slide, adjustable to vary the length of the stroke of the slide according to the length of the sausages.

13. In a sausage twisting machine, the combination with a sausage twisting device adjustable to vary the length of the sausages produced, of a reciprocating slide, a guide on which the slide moves, a rock shaft carried by said slide and having a projecting finger adapted to engage and draw sausages from said twisting mechanism, and cams on said shaft, engageable with the guide and acting to lift and drop the finger as the slide is reciprocated.

14. In a sausage twisting mechanism, the combination of two sets of nippers spaced apart, means to intermittently open and close said nippers, a rotary drum mounted in bearings between said sets of nippers and provided with fixed heads at opposite ends, each having a non-circular passage for the sausage casings, a sprocket wheel attached to the drum, a chain passing around said sprocket wheel, and means to drive said chain while the nippers are closed and to stop the drive while the nippers are open.

15. In a sausage twisting mechanism, the combination of two sets of nippers spaced apart, means to open and close said nippers, a rotary twisting drum located between the sets of nippers, a delivery device located behind the nippers and engageable with the sausages, means to intermittently open and close the nippers, means to rotate the drum while the nippers are closed and to stop the same while the nippers are open, means to operate said delivery device while the nippers are open and the drum is stopped, each of said means including a drive wheel provided with a segmental surface which operates the respective means at proper times.

16. The combination with a sausage forming mechanism, of a rotatable and transversely movable stick holder, means to deliver sausages from said mechanism to a stick in said holder, and means to operate the holder, including automatically acting reversing mechanism to reverse the travel of said holder when the stick is full.

17. In a sausage twisting mechanism, the combination of two sets of nippers spaced apart, means to intermittently open and close said nippers, a rotary drum mounted in bearings between said sets of nippers and provided with fixed heads at opposite ends each having a non-circular passage for the sausage casings, a sprocket wheel attached to the drum, a chain passing around said sprocket wheel, and means to drive said chain while the nippers are closed and to stop the drive while the nippers are open.

18. The combination with a sausage forming mechanism, of a multiple stick reel, delivery devices between said mechanism and said reel, to deliver sausages to a stick holder supported by the latter, means to reciprocate the reel lengthwise of the sticks, and means to turn the reel at the end of each stroke, to bring a new stick into position, said means including star wheels geared to the reel and cams engageable with the respective star wheels at the end of each stroke, and detents engaging the wheels alternately, to prevent back slip thereof.

In testimony whereof, I do affix my signature in presence of two witnesses.

RICHARD SWOBODA.

Witnesses:
   GEO. W. HERZ,
   WM. T. STARGER.